T. F. CARROLL.
SAW TOOTH SHAPER.
APPLICATION FILED OCT. 16, 1909.
997,040.
Patented July 4, 1911.
2 SHEETS—SHEET 2.
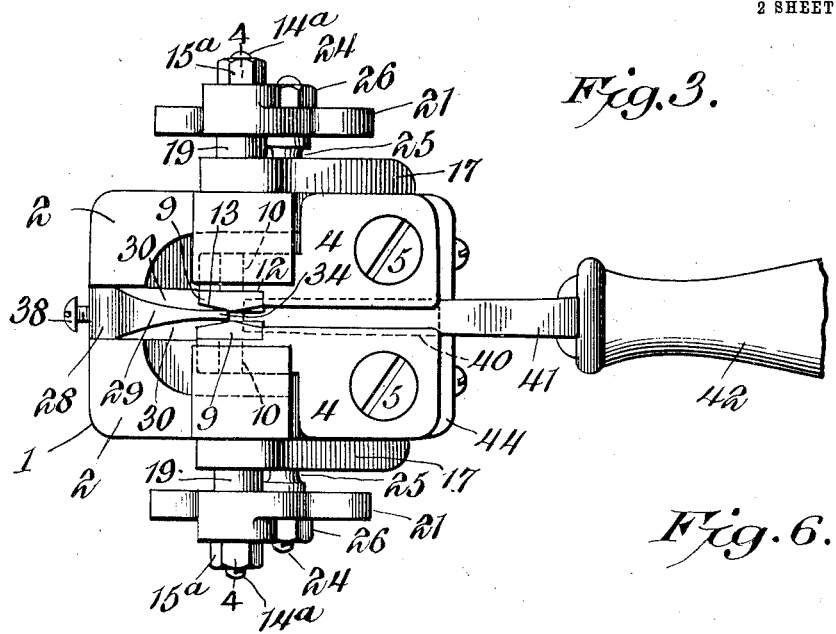
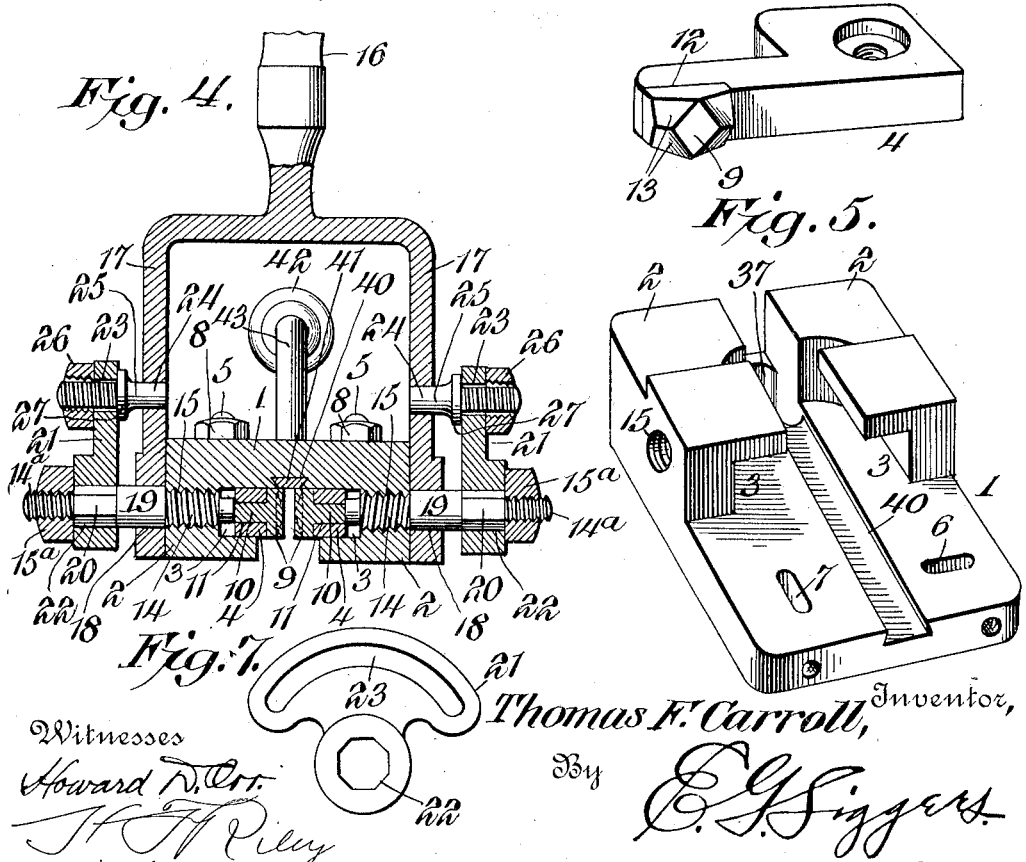
Thomas F. Carroll, Inventor,

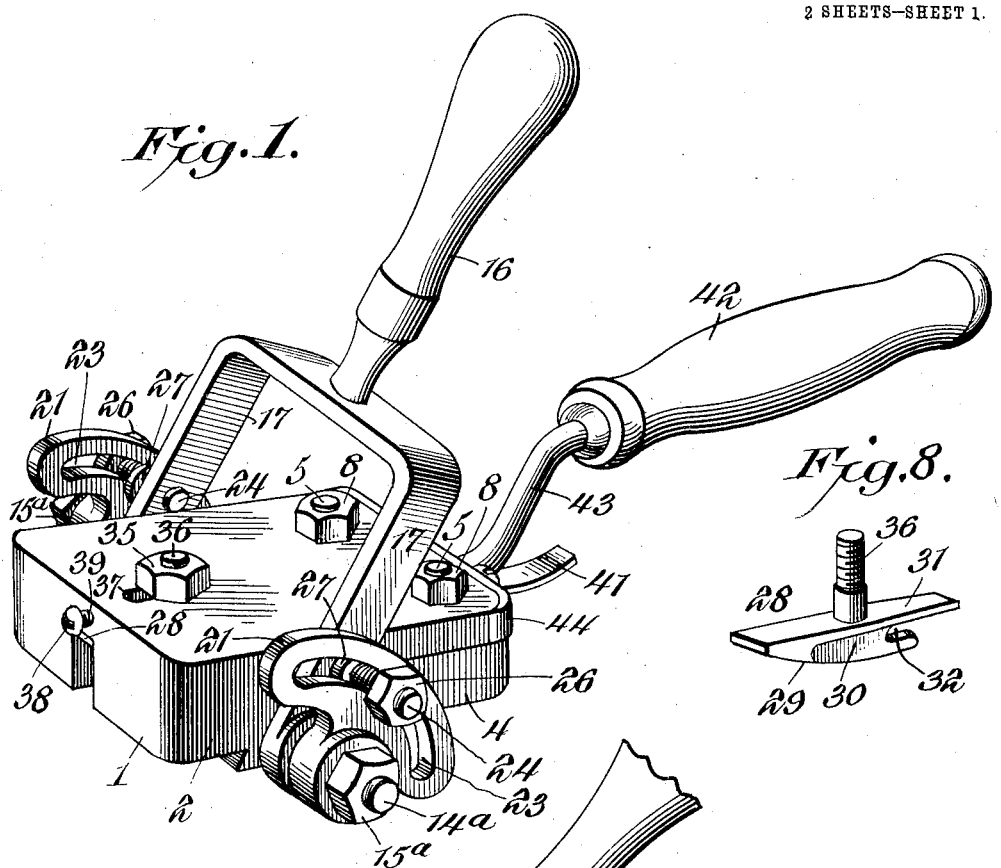

UNITED STATES PATENT OFFICE.

THOMAS F. CARROLL, OF EAU CLAIRE, WISCONSIN.

SAW-TOOTH SHAPER.

997,040.  Specification of Letters Patent.  Patented July 4, 1911.

Application filed October 16, 1909. Serial No. 523,094.

*To all whom it may concern:*

Be it known that I, THOMAS F. CARROLL, a citizen of the United States, residing at Eau Claire, in the county of Eau Claire and State of Wisconsin, have invented a new and useful Saw-Tooth Shaper, of which the following is a specification.

The invention relates to improvements in saw tooth shapers.

The object of the present invention is to improve the construction of saw tooth shapers, and to provide a simple, inexpensive and efficient device of this character, adapted to uniformly shape teeth of a saw blade, and capable of being readily moved over the same and properly positioned with relation to the teeth without injuring the point of the same.

A further object of the invention is to provide a saw shaper of this character capable of ready adjustment to arrange it for operating on saw blades of different thicknesses and to position a saw blade centrally of the device.

Another object of the invention is to produce a saw shaper having reversible and interchangeable dies provided with a plurality of tooth-engaging portions, adapted to be successively presented to a saw blade as they become worn.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a saw shaper, constructed in accordance with this invention. Fig. 2 is a central longitudinal sectional view of the same. Fig. 3 is a reverse plan view of the saw shaper. Fig. 4 is a transverse sectional view on the line 4—4 of Fig. 3. Fig. 5 is a detail perspective view of the head of the saw shaper. Fig. 6 is a similar view of one of the jaws. Fig. 7 is a detail view of one of the arcuate adjusting plates or members. Fig. 8 is a detail view of the gage.

Like numerals of reference designate corresponding parts of all the figures of the drawings.

1 designates a block or head, constructed of suitable metal and having spaced depending side portions 2, forming a saw-receiving groove or way and recessed at their inner faces at 3 for the reception of opposite jaws 4. The jaws, which have enlarged rear portions, are pivoted to the rear portion of the block or head at opposite sides thereof by pivot bolts 5, which pass through slots 6 and 7, arranged at right angles to each other, as clearly shown in Fig. 5 of the drawings and adapted to permit an adjustment of the jaws. The heads of the bolts 5 are counter-sunk in the lower faces of the jaws 4, and the nuts 8 of the pivot bolts are located at the upper face of the block or head. The front reduced portions of the jaws operate in the recesses 3 and are guided and supported by the depending side portions 2 which have solid inwardly extending front portions, and said jaws are equipped at their inner engaging sides with dies 9, having shanks 10 detachably fitted in transverse openings 11 of the front portions of the jaws. The front portions of the jaws are provided at their inner faces with recesses 12 to receive the dies, which are oblong and have a slight bevel 13 at each corner to provide a tooth engaging portion. The dies are interchangeable and reversible, being adapted to be turned end for end. By this adjustment any one of the beveled portions may be brought into position for engaging a saw tooth, and as one engaging portion becomes worn another may be presented for operation. This construction and arrangement enables the dies to be used for a considerable length of time without requiring new ones. The shoulders formed by the recesses 12 prevent rotary movement of the dies on their shanks.

The jaws are operated by opposite right and left hand screws 14, engaging corresponding threaded openings 15 of the spaced side portions of the block or head and adapted to be rotated to force the jaws inwardly to engage and shape a saw tooth. The screws are operated by an oscillatory handle or lever 16, having spaced side portions 17 approximately L-shaped and forming a fork for straddling the block or head.

The lower terminals of the spaced side portions of the handle are provided with circular openings 18, and are mounted on smooth rounded portions 19 of the screws. The screws are provided beyond the smooth rounded portion with polygonal portions 20, preferably of octagonal shape and receiving arcuate connecting plates or members 21, having polygonal openings 22, conforming to the configuration of the polygonal portion of the screws and removably fitted thereon and adapted to be detached and arranged in different positions with relation to the screws. The outer terminals 14ª are threaded to receive nuts 15ª for detachably retaining the connecting members on the polygonal portions of the jaw actuating screws. The connecting members 21 have arcuate slots 23, arranged concentric with the adjusting screws and receiving the bolts 24, or other suitable fastening devices for connecting the spaced side portions of the handle with the adjustable members 21. The bolts 24 have smooth terminal portions 25 and outer threaded portions, the smooth inner portions 25 being mounted in apertures of the side portions of the handle or lever, and the outer threaded portions being arranged in the arcuate slots 23 and receiving nuts 26 for engaging the outer faces of the members 21. The members 21 are clamped between the nuts 26 and collars or flanges 27 of the bolts, and the fastening means for connecting the handle with the plates or members 21 afford a rapid and complete adjustment of the latter. The screws are independently adjustable to enable the saw blade to be maintained centrally of the block or head, and they are adjustable with respect to the handle to enable saw blades of different thicknesses to be operated on, and the handle is adjustable with respect to the screws to enable it to operate in the same arc of movement at all times.

The saw shaper is positioned on a saw blade by means of a gage 28, tapered from front to rear to present a lower inclined face 29, and tapered also laterally to provide a reduced rear portion. The lateral taper is formed by side recesses 30, and the top portion 31 is extended in rear of the rear end of the depending reduced portion. The depending reduced portion formed by the said recesses 30 is provided at its rear end with a recess 32, adapted to receive the point of a saw tooth 33, as illustrated in dotted lines in Fig. 2 of the drawings, and forming a lower tooth-engaging portion 34. The lower tooth-engaging portion abuts against the front of the saw tooth below the point thereof, so that there is no liability of injuring the point in placing the device on a saw blade, and the point is also exposed by this arrangement, so that both sides of a saw tooth may be uniformly shaped by the dies of the jaws.

The gage is adjustable to position the dies properly with relation to the point of a tooth, and the said gage is secured in its adjustment by means of a nut 35, arranged on a threaded stem or shank 36, extending upwardly from the gage and operating in a longitudinal slot 37 of the block or head. An accurate adjustment of the gage is obtained by means of a screw 38, mounted in a threaded opening 39 of the block or head and located in advance of and abutting against the shank or stem 36. The screw 38 also by forming an abutment prevents any accidental displacement of the gage, so that there is no liability of the same slipping after it has been adjusted.

The block or head is provided in its lower face with a longitudinal groove 40, which receives the gage and which also receives a longitudinal strip 41, presenting a smooth surface to the saw teeth and extending rearwardly from the block or head and adapted to bridge the recess between a plurality of saw teeth and thereby enable the saw shaper to be readily moved over the cutting edge of a saw blade. The front portion of the longitudinal strip overlaps the rear portion of the gage and does not interfere with the adjustment of the same along the groove. The rear extended portion of the strip is curved upward at the outer end. The longitudinal groove is tapered or dovetailed in cross section, and the saw shaper is equipped at the back with a guiding handle 42, having a shank or stem 43 extending downwardly and forwardly and provided at the front with laterally extending attaching arms 44, which are secured by screws or other suitable fastending devices to the rear edge of the block or head. The operator grasps the guiding handle with one hand and the operating handle or lever with the other hand, and the saw shaper is placed on a saw blade with the gage abutting against the tooth to be operated on. The handle or lever is then swung rearwardly to carry the shaping dies into engagement with the saw tooth, which is uniformly shaped at each side. The device is then advanced on the saw and engaged with the next tooth, the operation being continued until all the teeth of the saw have been shaped. After the teeth of one saw blade have been operated on, the device may be readily adjusted to alter the position of the parts to adapt them for operating on a saw blade of different thicknesses, or one having teeth of a different character.

Having thus fully described my invention, what I claim as new and desire to secure by Letters Patent, is:—

1. A device of the class described including a block or head, opposite jaws, right and left hand screws mounted in the head and arranged to actuate the jaws and provided with rounded portions located at the side faces of the block or head, said screws being also provided with outer polygonal portions arranged beyond the rounded portions, a handle having spaced sides mounted on the rounded portions of the screws and fitted against the side faces of the block or head, adjustable plates provided with polygonal openings and adjustably and detachably mounted on the polygonal portions of the screws, said plates being also provided with arcuate slots, bolts extending through the slots of the plates and provided intermediate of their ends with collars and having smooth inner portions mounted on the sides of the handle, and nuts arranged on the bolts and engaging the plates and clamping the same against the said collars.

2. A device of the class described including a block or head provided with a longitudinal slot and having a threaded opening in advance of the slot, opposite laterally movable jaws, a gage depending from the block and having a threaded shank extending through the said slot, a nut mounted on the shank, and a set screw mounted in the threaded opening of the block and abutting against the shank of the gage.

3. A device of the class described, including a block having spaced depending sides provided with a longitudinal groove extending between the said sides, jaws operating between the spaced sides and supported and guided by the same, a gage mounted in and adjustable along the front portion of the groove and arranged between the depending sides of the block, and a longitudinal strip mounted in the groove in rear of the gage and arranged to rest upon the cutting edge of a saw blade and having its front portion overlapping the rear portion of the gage.

4. A device of the class described including a block having spaced integral depending sides provided with inwardly extending front portions, said block being also provided with a longitudinal groove, opposite jaws supported and guided by the depending sides, a gage mounted in the front portion of the said groove between the inwardly extending front portions of the sides of the block, a strip mounted in the rear portion of the groove and extending rearwardly from the block and arranged to rest upon the cutting edge of a saw blade, and a handle located above the extended portion of the strip and connected with the block.

5. A device of the class described including a block or head provided with spaced integral sides depending from the lower face of the block or head at the front thereof and having recesses in their inner faces open at the back and terminating short of the front ends of the sides, which have solid front portions, opposite jaws guided in the recesses of the depending sides and supported by the latter, means for operating the same, and a gage adjustably mounted between the solid front portions of the sides of the block or head.

In testimony that I claim the foregoing as my own, I have hereto affixed my signature in the presence of two witnesses.

THOMAS F. CARROLL.

Witnesses:
MANDA RONNEY,
J. F. FARR.

---

Copies of this patent may be obtained for five cents each, by addressing the "Commissioner of Patents, Washington, D. C."